United States Patent [19]

Miyaoku

[11] 3,915,299

[45] Oct. 28, 1975

[54] PLASTIC NAIL AND A PLASTIC NAIL STRIP FOR AN AUTOMATIC HAMMER

[75] Inventor: Mataichi Miyaoku, Fuchu, Japan

[73] Assignee: Fuchu Plastic Kigyo, Japan

[22] Filed: Aug. 16, 1974

[21] Appl. No.: 498,034

Related U.S. Application Data

[63] Continuation-in-part of Ser. No. 293,348, Sept. 29, 1972, abandoned.

[30] Foreign Application Priority Data

Sept. 30, 1971 Japan.............................. 46-90431
May 31, 1972 Japan.............................. 47-64037

[52] U.S. Cl................................... 206/345; 85/10 R
[51] Int. Cl.².................. B65D 85/24; F16B 15/08
[58] Field of Search .......... 206/345, 343; 85/17, 21

[56] References Cited
UNITED STATES PATENTS

| 262,287 | 8/1882 | Goddu | 85/21 X |
|---|---|---|---|
| 889,667 | 6/1908 | Draemel | 85/21 X |
| 2,294,463 | 9/1942 | Krantz | 85/17 |
| 3,225,917 | 12/1965 | Couch | 206/345 |
| 3,492,907 | 2/1970 | Hauck | 85/17 |

*Primary Examiner*—Leonard Summer
*Attorney, Agent, or Firm*—Otto John Munz

[57] ABSTRACT

A hard plastic nail, having resistance to a compressing force of a hammer stroke, as a component for a series of nails joined side-by-side to form a strip, for feeding into an automatic hammer and to be driven through material to be nailed, such as wood and/or plastic sheeting and supports, is provided with accurately positioned perforations, running through its width perpendicularly to its longitudinal axis and in the central plane of the strip.

The dimension of the shank of each nail in the direction normal to the aforesaid plane of the strip, preferably is greater than its thickness, that is, its transverse dimension in said plane.

A thin plastic belt of low shearing resistance and having a cross-section to essentially fit the perforations, is threaded through the perforation of each nail thus connecting them into the strip, so that a portion of the belt with the nail through which it is threaded is severed or sheared by the hammer stroke. The nail head is elongated in the direction normal to the aforesaid plane of the strip, to thereby form projections which mate slidingly with the corresponding conventional grooves of the hammer and the shank has a shape to clear any portions of the interior of the hammer, to thus permit a free sliding of the nail strip through a conventional magazine of the hammer.

Preferably perforations are provided in each nail for two plastic belts to connect the nails into a strip, one perforation being adjacent the nail-head surface and the other in the upper half of the shank near its center.

The belt has a consistency permitting easy shearing by the hammer stroke, while the plastic nail has a greater hardness offering resistance to the driving force of the hammer.

The tip of the nail has a length from about 1 to 1½ times that of the cross-sectional diameter of the shank.

The shank may be formed with voids or serrations, permitting penetration into them of the surrounding material after the nail has been driven through it to thus effect greater holding power.

8 Claims, 9 Drawing Figures

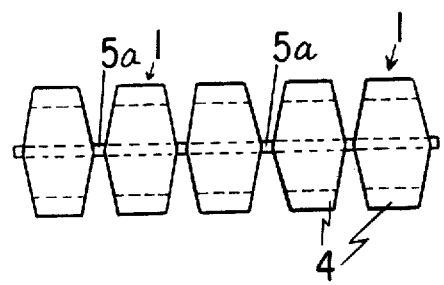
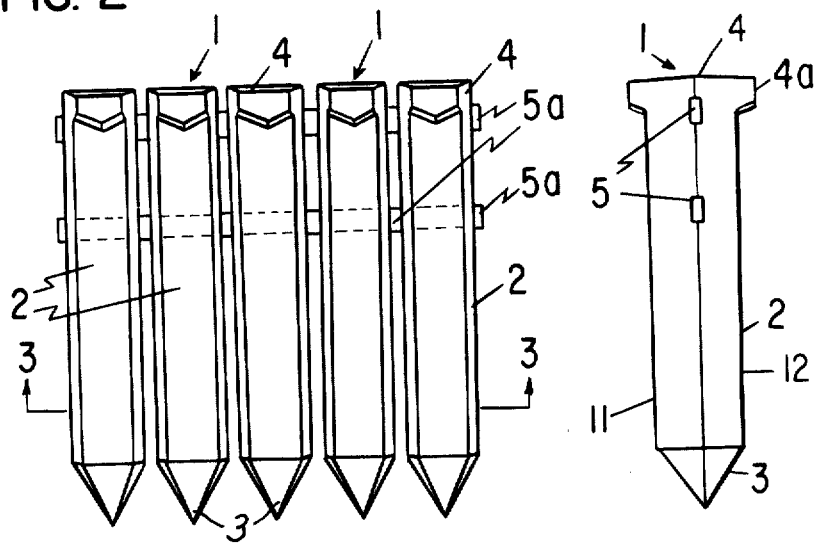
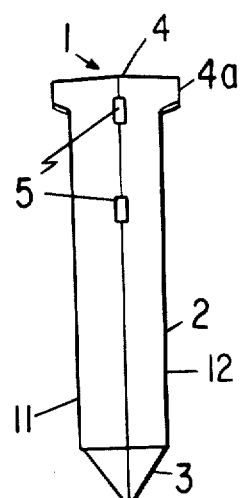
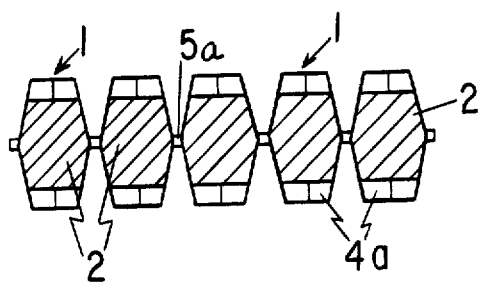

PLASTIC NAIL AND A PLASTIC NAIL STRIP FOR AN AUTOMATIC HAMMER

CROSS REFERENCE TO PRIOR APPLICATIONS

This is a CIP of copending U.S. Patent Office Ser. No. 293,348 filed Sept. 29, 1972, now abandoned, and the filing date thereof and priority of corresponding Japanese Patent Application No. 90431/71 filed Sept. 30, 1971 are claimed under the convention.

FIELD OF THE INVENTION

A plurality of molded plastic nails assembled into a strip by a web or belt.

DESCRIPTION OF THE PRIOR ART

The prior art nails strips are entegrally formed of plastic material having the same consistency or shearing resistance as their interconnecting webs.

Thus the resistance of the nail to the driving force of an automatic hammer necessarily is lowered and/or of the shearing resistance of the web is increased, which affects adversely the quality of the nail and/or the shearing performance of the hammer. U.S. Pat. Nos. 3,492,907 to Hauck, 294,111 to Brock and 423,535 to Taylor are made of record.

SUMMARY

The primary object of the invention is to avoid these deficiencies of the prior art and to provide a nail strip having a high resistance to compression of the nail by the driving force of the hammer and simultaneously a low resistance of the strip to its shearing force. This is being accomplished by providing side-to-side perforations in each nail permitting their aligning into a row and threading a belt through them to connect them into a nail strip of superior quality to that of the prior art.

BRIEF DESCRIPTION OF THE DRAWINGS

Embodiments of the invention will be explained with reference to the accompanying drawings, in which like reference numerals refer to same or equivalent parts.

FIG. 1 is a plan view of a series of independent nails connected into a strip of nails.

FIG. 2 is a side elevational view of the embodiment shown on FIG. 1.

FIG. 3 is a horizontal cross-sectional view along the line III . . . III of FIG. 2 looking in the direction of the arrows;

FIG. 4 is a side view of a single nail of the invention; and

DESCRIPTION OF THE PREFERRED EMBODIMENTS

Figure 5:
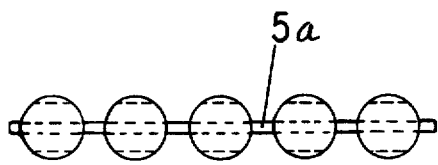
FIGS. 5, 6, 7a, 7b and 8 are views of horizontal cross-sections: circular, triangular, square and oval respectively.
Figure 6:
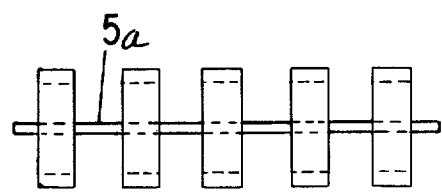
Figure 7A:
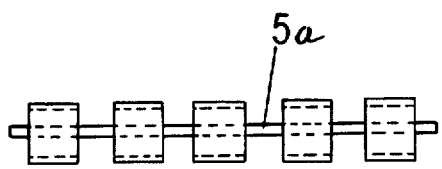
Figure 7B:
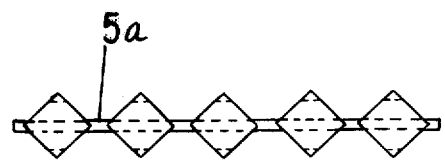

There is shown in FIGS. 1 to 3 a strip of connected nails to be fed into a device such as a pneumatic hammer, which in sequence dispenses single nails from the strip, thus separating them from the strip by striking their heads to hammer them into the desired position, usually into wood, plastic, fibre boards, etc.

There is shown on FIG. 4 one of the two identical sides of a single nail.

The nail 1 is made preferably of a conventional plastic, having the required properties of strength, resistance to compression, brittleness, bending on impact, with a smoothness of surface and hardness required of a conventional nail and possessing the additional properties of resistance to moisture and corrosion.

The nail has an elongated shank 2 with a head 4 and a penetrating point 3 on the opposite ends thereof.

The shank has at least one perforation 5 extending therethrough normal to its central longitudinal axis and in the central plane of the strip.

The perforation or perforations are preferably elongated in the direction of the longitudinal axis of the shank 2 and symmetrically through its longitudinal center line.

Two such perforations strategically spaced from each other and located in the upper half of the nail as shown on FIG. 4 provide a superior balance of the strip when positioned within the power driving hammer.

The upper surface of the head is substantially flat and is formed with projections such as 4a, FIG. 4, on the front and rear sides and which merge or taper off into the shank as clearly shown upon said figure. As shown at FIGS. 1 and 3 each head and shank have the shape of an elongated hexagon of a length from front to rear greater than the maximum width thereof in the central plane of the strip.

Thus the nail may be driven substantially into the nailed material flush therewith.

The horizontal cross-section of the nail and its head must mate sufficiently with the nail-receiving grooves of the hammer, in which the strip fits to permit free passing thereof therealong without impediment. The hexagonal shape of the head and shank of each nail, wherein their transverse dimensions are essentially the same in the plane of the strip, and increased in the direction normal to said plane, enables the assembling into a strip of given length of a greater number of nails without affecting the strength of their shank.

The horizontal cross-section of the nail is shown on FIG. 3 as a hexagon, but is not limited to this shape. Preferably the head of the nail has on its identical opposite front and rear sides lips 4a, which suspend it while it passes through the groove of the hammer.

In accordance with the invention the specific hexagonal cross-sectional shape of the nail's head and body shown, enables compact stacking and connecting a greater number of nails into a strip of given over-all length, than would be possible in accordance with the teachings of the prior art. Simultaneously the efficiency of feeding the strip through the hammer is improved. The perforation or perforations such as 5, FIG. 4 with their connecting bands and aligments work also with circular, elliptical, triangular and square cross-sections of the nail. Projections and/or dents, notches, cutouts, concavities, ridges, threads and similar contours (not shown) to effect added holding power may be imparted to the shank of the nail, as desired, as long as these do not interfere with its progress through the hammer.

Figure 8:
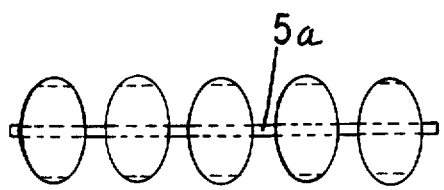

The head 4 and the cross-section of the body 2, may be polygonal as shown in FIGS. 1, 3, 6, 7a and 7b or circular (FIG. 5) or oval (FIG. 8).

The nail may be partially formed with projections and/or concavities (not shown), disposed along its ridges 11 and 12. After a nail has been driven and thus severed and the belt has been thus sheared, the portion remaining in the web or belt projects from the side of the next nail of the strip, and such portion prevents slipping out of the web pending driving of the next nail. Mass production based on a uniform standard size can be easily provided. The nail of the invention may be made of steel-reinforced plastics, such as methyl methacrylate, and it has excellent waterproof, anti-moisture and anti-corrosion properties. It is smooth on the surface and the strip is easily charged into the hammer. The belt is cut smoothly and automatically and the head is driven exactly into a desired position.

The web or belt 5a is made preferably of a plastic, sufficiently hard and sturdy to withstand deformations during sliding of the strip through the grooves of the hammer and striking of the preceding section by the hammer, calculated, however, to yield to the shearing force of the hammer on impact to permit cutting off a section thereof threaded through the perforation and to pass it out from the hammer in and together with the nail which was struck. Polyethylene or polyvinyl are suitable for this.

Although not shown, voids may be provided in the nail shank so that, when driven into relatively elastic material, the material will recover to enter the voids and thus increase the holding power of the nail.

The spacing of the perforations relative to each other and the ends of the nail is calculated to increase the integral strength of the strip by the bands passing through them, as the nail travels through the grooves of the hammer, without hampering the severance of the individual nails emergng from the hammer. Should the perforation for the webs or belts be situated in the lower half of the shank, the shearing action would be impaired. Thus the upper portion of the shank was selected for the perforations as shown in scale on FIGS. 2 and 4 as most advantageous.

The inventor discovered that optimum results are achieved with two perforations, an upper situated closely in or below the head of the nail and a lower spaced therefrom still in the upper half of the shank at about one-third of the total length of the nail.

A connecting band 5a is threaded through the perforations of the adjacent nails mating with the cross-section of the perforation in a tight engagement therewith. The individual nails are thus connected equidistantly spaced from each other side by side with the heads and points, respectively, in alignments into a contiguous temporarily integral strip having a sufficient sturdiness and inflexibility to permit its feeding into the hammer, smoothly sliding through its grooves without offering any obstacles by the interconnecting band and permitting severance of each nail struck by the hammer, without deforming the following advancing nail or its proper position in the remaining strip.

The length proportions between the tip and the shank of the nail as shown to scale in FIG. 2 and 4 are calculated for this purpose.

The inventor discovered that the penetrating tip of the nail advantageously has a length from about 1 to 1½ times that of the cross-sectional diameter of the shank, made with a minimum necessary body and cross-sectional area to avoid bending of the nail.

A further advantageous improvement enhancing the penetrating property of the plastic nail of the present invention, when imparting to it a hexagonal cross-section is to provide the penetrating point of a hexagonal conical shape.

Since the penetrating qualities of the materials to be nailed vary, the inventor found that the above dimensions and shapes provide the best overall performance for the conventional variety of materials intended to be nailed with the nail of the invention. The power nail-driving hammers are conventional. U.S. Pat. Nos. 3,165,868 and 2,927,324 are representative of the art and are classified in class 1 subclass 40 plus.

In the claims the term "plane of the strip" means the common plane determined conjointly by the parallel longitudinal axes of the nails, such for instance as a plane through web 5a, FIG. 1, normal to the plane of the figure.

What is claimed is:

1. A nail strip for use in an automatic nail-driving machine, comprising, a plurality of nails of plastic having relatively great hardness, each having a central longitudinal axis, a head, a one-piece shank and at least one perforation through its shank, normal to said axis, and a web of plastic material of hardness less than that of said nails, said web frictionally passing through all said perforations to interconnect said nails in side-by-side relation, into a strip.

2. A nail strip as claimed in claim 1, there being one perforation through each said shank positioned in the half thereof contiguous to said head.

3. A nail strip as claimed in claim 2, the cross-section of the shank of each nail, normal to its longitudinal axis being an elongated hexagon of lesser dimension in the plane of the strip than in the direction normal to said plane.

4. A nail strip as claimed in claim 2, the cross-section of the shank of each said nail in a plane normal to said longitudinal axis being square.

5. A nail strip as claimed in claim 2, the cross-section of the shank of each said nail in a plane normal to said longitudinal axis, being oval.

6. A nail strip as claimed in claim 2, there being a second perforation in and through the shank of each nail, spaced below said one perforation and positioned in the upper half of said shank, and a second web passing through all the second perforations in said nails.

7. A nail strip as claimed in claim 6, said second perforation in each nail being located about one-third the length of the shank, below its head.

8. The nail strip of claim 1, said nails being of methyl methacrylate, said web being selected from the group consisting of polythylene and polyvinyl.

* * * * *

UNITED STATES PATENT AND TRADEMARK OFFICE
CERTIFICATE OF CORRECTION

PATENT NO. : 3,915,299
DATED : October 28, 1975
INVENTOR(S) : MATAICHI MIYAOKU

It is certified that error appears in the above—identified patent and that said Letters Patent are hereby corrected as shown below:

City - residence of inventor should be -- HIROSHIMA -- not "Fuchu".

Signed and Sealed this twenty-seventh Day of January 1976

[SEAL]

Attest:

RUTH C. MASON
*Attesting Officer*

C. MARSHALL DANN
*Commissioner of Patents and Trademarks*